(12) United States Patent
Deetz et al.

(10) Patent No.: US 8,627,020 B2
(45) Date of Patent: *Jan. 7, 2014

(54) SECURITY ERASE OF A DELETE FILE AND OF SECTORS NOT CURRENTLY ASSIGNED TO A FILE

(75) Inventors: Randell Deetz, Costa Mesa, CA (US); Gary William Streuter, San Clemente, CA (US); Kenneth Burke, Costa Mesa, CA (US); James Sedin, Ketchum, ID (US)

(73) Assignee: CMS Products, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/562,493

(22) Filed: Jul. 31, 2012

(65) Prior Publication Data

US 2012/0300331 A1  Nov. 29, 2012

Related U.S. Application Data

(63) Continuation of application No. 13/236,220, filed on Sep. 19, 2011, now Pat. No. 8,234,462, which is a continuation of application No. 12/686,291, filed on Jan. 12, 2010, now Pat. No. 8,024,530.

(60) Provisional application No. 61/144,670, filed on Jan. 14, 2009.

(51) Int. Cl.
*G06F 12/00* (2006.01)

(52) U.S. Cl.
USPC .......................................................... 711/152

(58) Field of Classification Search
None
See application file for complete search history.

(56) References Cited

U.S. PATENT DOCUMENTS

| | | |
|---|---|---|
| 6,731,447 B2 * | 5/2004 | Bunker et al. ............... 360/60 |
| 7,308,543 B2 | 12/2007 | Kishi |
| 7,469,327 B2 | 12/2008 | Kawamura et al. |
| 7,570,560 B2 | 8/2009 | Sun et al. |
| 7,571,475 B2 | 8/2009 | Moon |
| 7,739,462 B2 | 6/2010 | Dewey |
| 7,873,870 B2 | 1/2011 | Ohara |
| 2008/0016132 A1 | 1/2008 | Merhar |

* cited by examiner

*Primary Examiner* — Hiep Nguyen
(74) *Attorney, Agent, or Firm* — Law Office of Scott C. Harris, Inc.

(57) ABSTRACT

Secure erase of files and unallocated sectors on storage media such that any previous data is non-recoverable. The database contains sets of data patterns used to overwrite the data on different physical media. The software programs manage the overwriting process automatically when a file has been deleted. When de-allocated sectors in the file system are pruned from a file or escaped the file deletion process also finds them. Data will never be found on deleted sectors or on pruned sectors is overwritten.

22 Claims, 7 Drawing Sheets

SECURITY ERASE OF A DELETE FILE AND OF SECTORS NOT CURRENTLY ASSIGNED TO A FILE

CROSS-REFERENCE

This application is a continuation application of U.S. patent application Ser. No. 13/236,220 filed Sep. 19, 2011, now U.S. Pat. No. 8,234,462 issued Jul. 31, 2012, which is a continuation of U.S. patent application Ser. No. 12/686,291 filed Jan. 12, 2010, now U.S. Pat. No. 8,024,530 issued Sep. 20, 2011, which claims priority from provisional application No. 61/144,670, filed Jan. 14, 2009, the disclosure of which is herewith incorporated by reference in their entirety.

BACKGROUND

There has long existed a basic need for rendering old, expired, or sensitive data unreadable by forensic methodologies. Businesses routinely reformat and/or carry out other actions, such that externally attached disk drives and other storage media such that sensitive data can not be read by persons who should not have access to that data. Over the years several schemes have been designed to thwart attempts to recover data from storage devices where the files have been deleted and in some cases where the storage device itself has been reformatted. However, it is believed that it is still possible to recover sensitive classified and business data from such a hard drive.

Typical methods of rendering data residing on storage devices unreadable involve writing different patterns over the old data. While this would seem to render the older data unrecoverable, it often is not the case. Different physical media types often do not completely switch the magnetic state of bits of the old data when written over. Sophisticated recovery techniques, therefore, can still obtain the data that has been "deleted" in this way.

Generally the types of utilities that attempt to render data unrecoverable require the user to explicitly execute the program and to name the file to be security wiped or erased. Other utilities are launched on a scheduled basis and are driven by script files. Still other methodologies are in place to allow IT departments and administrators to decide when and what behavior the security erase programs are to exhibit.

SUMMARY

The embodiments define ways to overcome these shortcomings for security erasing and rendering forensic attempts at recovering data unsuccessful.

Embodiments maintain a database with optimal overwrite patterns for each type of physical media that will be security erased. The embodiments have at least two basic modes of operation. A first mode security erases files when the file is deleted by the file system. A second mode covers those cases where allocation units in the form of single sectors or clusters of sectors have been pruned from a file and thus escape the security erase at file delete time; or are sectors that were returned to a sector/cluster allocation table without being security erased due to some software or hardware design, malfunction, or failure. This mode is triggered on a cyclic or scheduled basis. The embodiments scan the sector/cluster allocation table, reading unallocated sectors and comparing the data on the sector with the final pattern used to overwrite data on that specific physical media type. If the final pattern is not present on the sector, these embodiments will initiate a security erase.

BRIEF DESCRIPTION OF THE DRAWINGS

Embodiments of the embodiments are illustrated by way of example, and not by way of limitation. The following figures and the descriptions both brief and the detailed descriptions of the embodiments refer to similar elements and in which.

DETAILED DESCRIPTION

Figure 7:
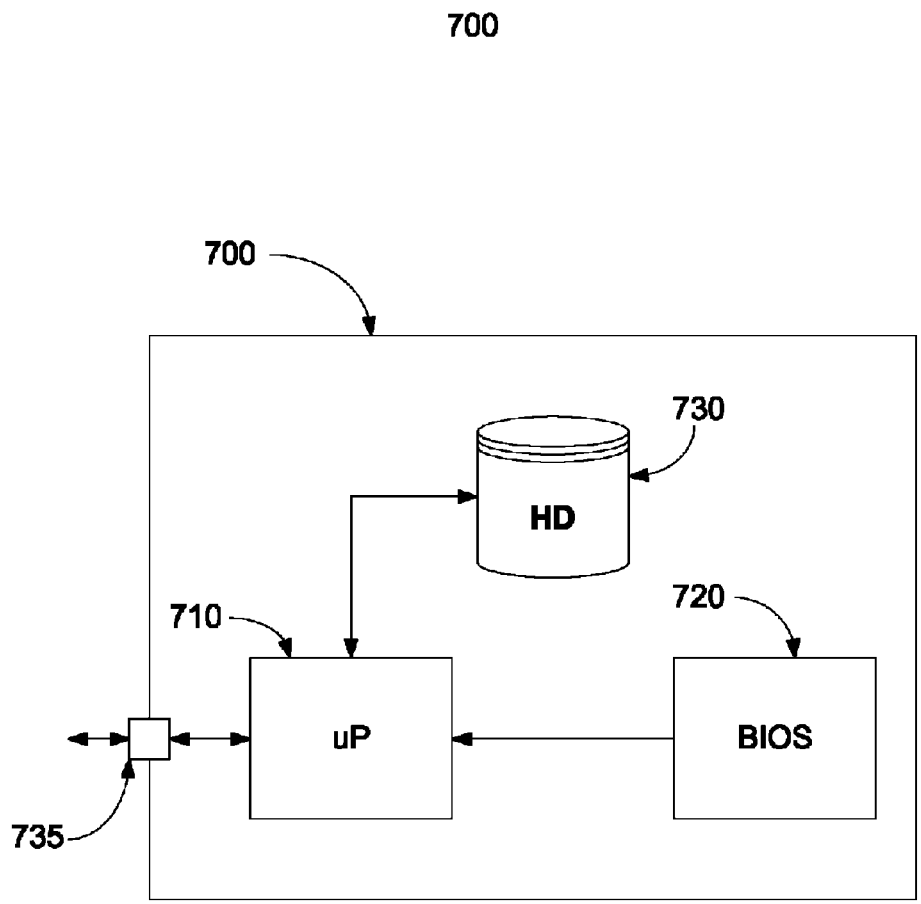
FIG. 7 shows a block diagram of a computer system using this technique.

The present embodiments operate a computer system of the type shown as 700 in FIG. 7. Boot is carried out using a processor 710 to execute the instructions in a system BIOS. There is at least one physical storage device, e.g. a hard drive 730 or solid state drive residing within said computer system or attached to said computer system through an external bus 735. The external bus can be any of USB, IEEE-1394, E-SATA, SATA, Ethernet. The external bus can be any of a plurality of wireless links such as but not limited to 802.11. The computer runs an operating system encompassing a file system. The storage device stores information, as described herein. As conventional, the computer 700 can also have a user interface, RAM, display ports, and other conventional parts.

Figure 1:
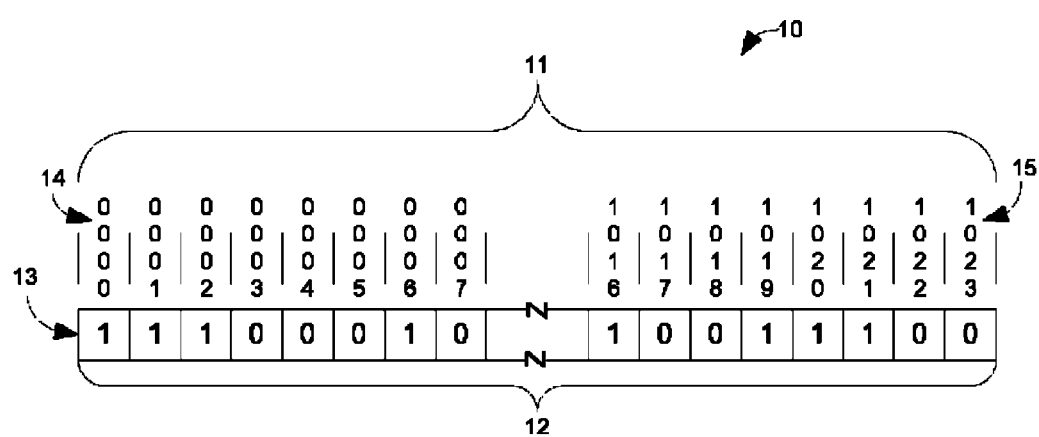
FIG. 1 depicts a sector or cluster allocation table or map.

FIG. 1 shows a representation of a sector or cluster allocation map 10 of a hard drive such as 730. This particular map is 1,024 bits wide which represents a storage device or partition that has 1,024 sectors or 1,024 clusters. If this map represented 1,024 sectors, the storage device would be 524,288 bytes in size. These maps generally represent clusters where a single cluster may contain from one sector to many sectors. Typically a cluster would contain 16, 32, or 64 sectors. A cluster size of 64 means that each cluster is made up of 64 sectors of 32,768 bytes. If the cluster map were 1,024 bits in size, that means that the storage device contains 33,554,432 bytes. There are many trade-offs in selecting cluster sizes which are not germane to the embodiments.

The representation of cluster maps in the following descriptions show allocated sectors/clusters as a binary "1" and a binary "0" if they are unallocated.

The sector/cluster map 10 depicted in FIG. 1, 10, contains 1,024 bits. Bit address map 11 shows the first 8 addresses and the last 8 addresses for purposes of clarity. The first sector/cluster 13 which is bit address 0000 14 shows that sector/cluster 13 is allocated by virtue of its value being equal to "1". Thus sector/cluster map 12 has the first 3 sectors/clusters allocated (value="1"). Sector/cluster map 12 also shows that last bit address 15 in sector/cluster map 12 is un-allocated by virtue of its value equal to "0".

Figure 3:
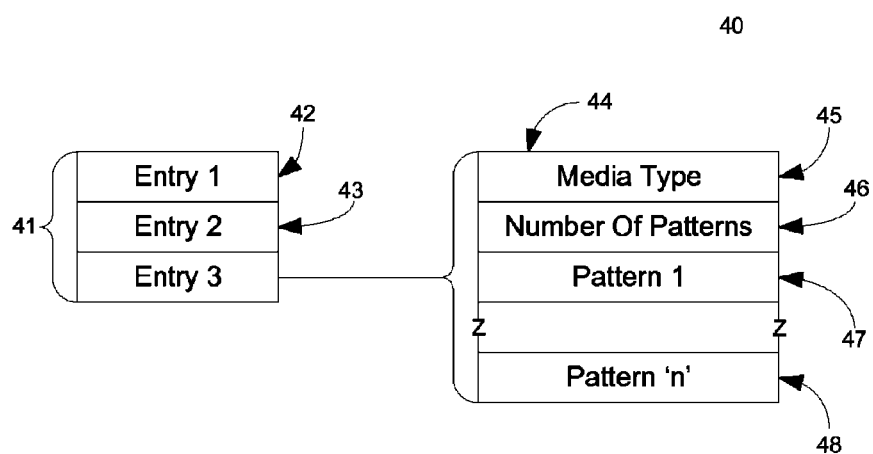
FIG. 3 depicts a database with entries specific to different physical media types and specific data overwrite patterns for each physical media type.

FIG. 3 is a representation of a database 40 where each entry 42, 43, and 44 contain sets of records specific to particular types of storage media. Entry 3; item 44, contains specific overwrite data for media type 45. Entry 3 also contains number of patterns 46 which specifies the number of unique overwrite patterns for this storage media type. For entry 3; 44 there are "n" overwrite patterns represented by pattern 1; 47 to pattern "n" 48. When an overwrite operating is being executed, the software program 50 or 70 uses number of patterns 46 and pattern 1 47 through pattern "n" 48 to ensure that overwritten data is not recoverable.

Figure 2:
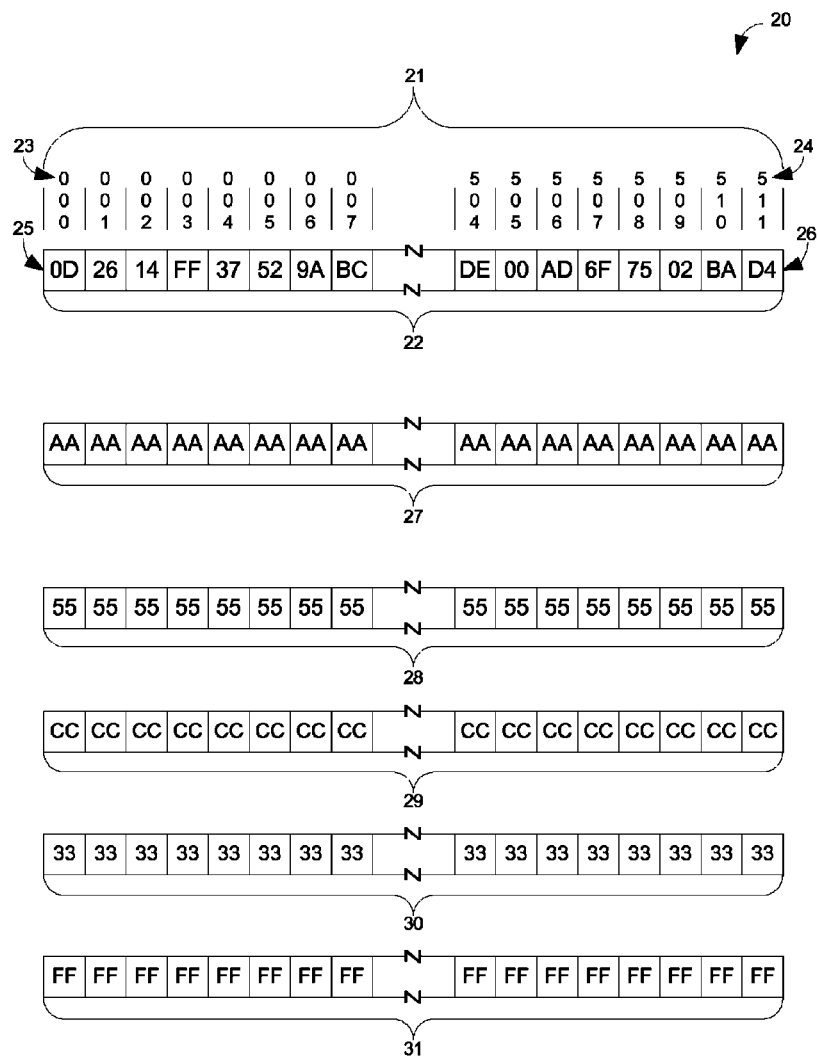
FIG. 2 depicts a sector of data and 5 overwrite patterns.

FIG. 2 shows a representation 20 of a single sector of data. Sector byte address map 21 shows the byte addresses ranging from 000 23 to 511 24. Note that this address map shows sector 22 which contains 512 addressable bytes of data. The first byte of data is sector address 0 23 and the last byte of data is sector address 511 26. Also note that only the first 8 bytes of sector 22 and the last 8 bytes of sector 22 are shown for purposes of clarity. In FIG. 2, sector data is represented as hexadecimal values. Sector 22 contains the data that was written to the storage device by some application. Also shown are 5 overwrite patterns as pattern 1 27, pattern 2 28, pattern 3 29, pattern 4 30, and pattern 5 31. Overwrite patterns typically contain alternate bit patters. For example, pattern 1 27 contains the hexadecimal value "AA" which has a binary pattern of "1010 1010". Pattern 2 28 contains the hexadecimal value "55" which has a binary pattern of 0101 0101". Note that these 2 patterns are made up of alternating bits and the bits between each pattern are different. When pattern 1 27 is written, then pattern 2 28 is written over pattern 1 27, each bit will have been written as a "1" and then written as a "0".

Pattern 3 29 contains the hexadecimal value "CC" which has a binary pattern of "1100 1100". Pattern 4 30 contains the hexadecimal value "33" which has a binary pattern of 0011 0011". Note that these two patterns are made up of alternating groups of bits and the bits between each pattern are different. When pattern 3 29 is written then pattern 4 30 is written over pattern 3 29, each group of 2 bits will have been written as a "1" and then written as a "0".

Pattern 5 31 contains the hexadecimal value "FF" which has a binary pattern of "1111 1111". Typically a pattern with all bits in a byte being equal to "1" or "0" will be the final pattern written to the storage media.

The patterns represented here are not to be construed as being the actual over write patterns for any physical media type. The values shown in pattern 1 27 through pattern 5 31 are for the purposes of explaining portions of the embodiments.

Figure 4:
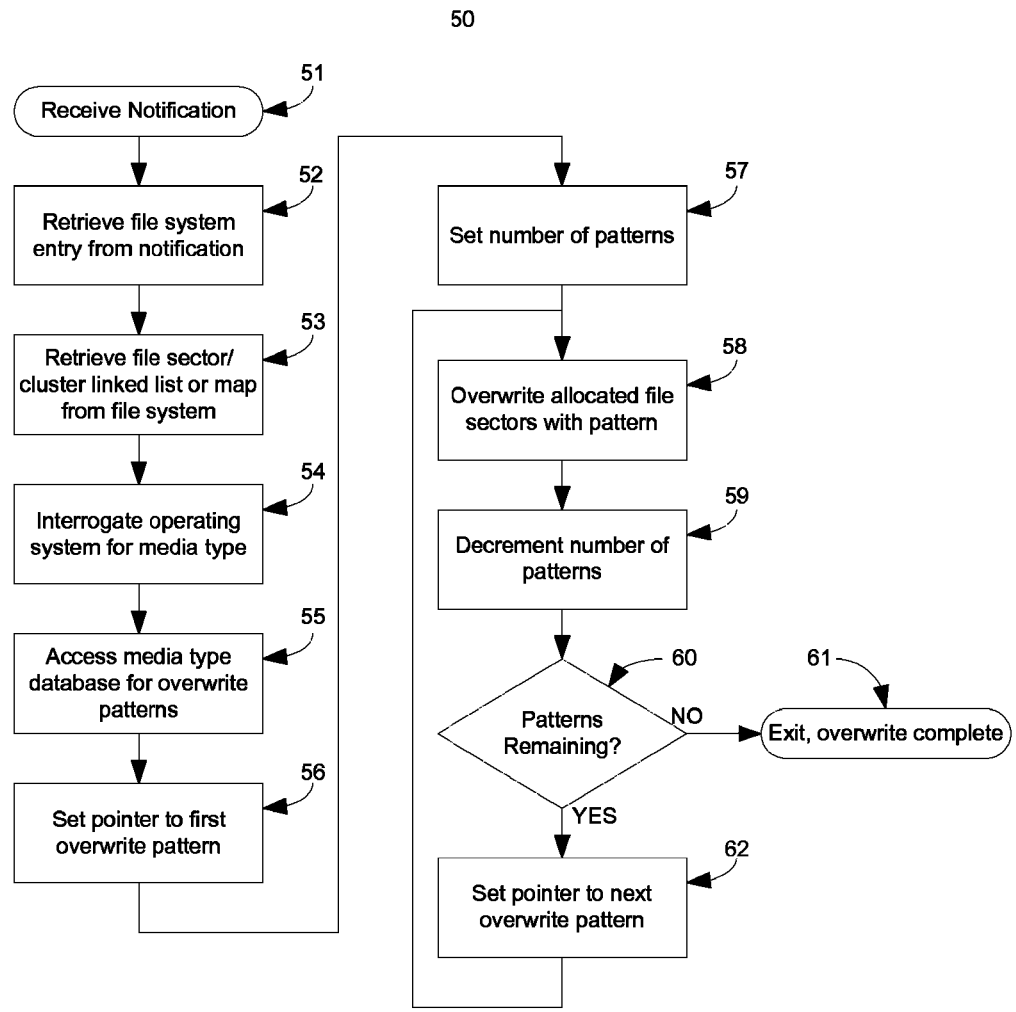
FIG. 4 depicts the logic flow chart for a software program that is launched by the file system or operating system either just before a file is deleted or just after a file is delete such that the software program depicted by FIG. 4 can perform a secure erase of the file.

FIG. 4 shows the logic flow 50 of the file overwrite software program of the embodiments. In this flow 50, the file system or operating system of the computer system the embodiments is running, or will call or cause software program 50 to be executed. When software program 50 is started, receive notification 51 starts the execution. Processing block 52 retrieves from the file system entry. The file system entry may have been passed to software program 50 as a function of the calling process or process block 52 may make calls to the operating system to retrieve the entry for the deleted file. Processing block 53 then retrieves the sector/cluster linked list or map of allocated sectors that had been assigned to the file that was deleted. Note that the file system may delete the file prior to calling software program 50 or may call software program 50 prior to actually deleting the file and returning the sectors/clusters to the allocation map or pool.

Processing block 54 interrogates the operating system for the physical media type containing the sectors for the file sectors that are to be security erased. Using the media type provided by the operating system, processing block 55 accesses database 40. Processing block 56 sets a pointer to pattern 1 47 which is the first overwrite pattern for media type 45. Processing block 57 retrieves the number of patterns 46 and places the number of patterns into a counter.

The overwrite cycle starts with processing block 58 which overwrites the pattern indicated by the pointer set in processing block 56. After the pattern has been written on all of the sectors identified by the linked list or map obtained by processing block 53, processing block 59 will decrement the number of patterns counter set by processing block 57. Decision block 60 checks to see if the pattern counter is equal to 0. If the pattern counter is equal to 0, then software program 50 will exit at exit point 61. If the pattern counter is not equal to 0, processing block 62 will move the pattern pointer set by processing block 56 to the next pattern in the sequence of patterns then passes control to processing block 58 which starts the next overwrite pattern write.

Figure 5:
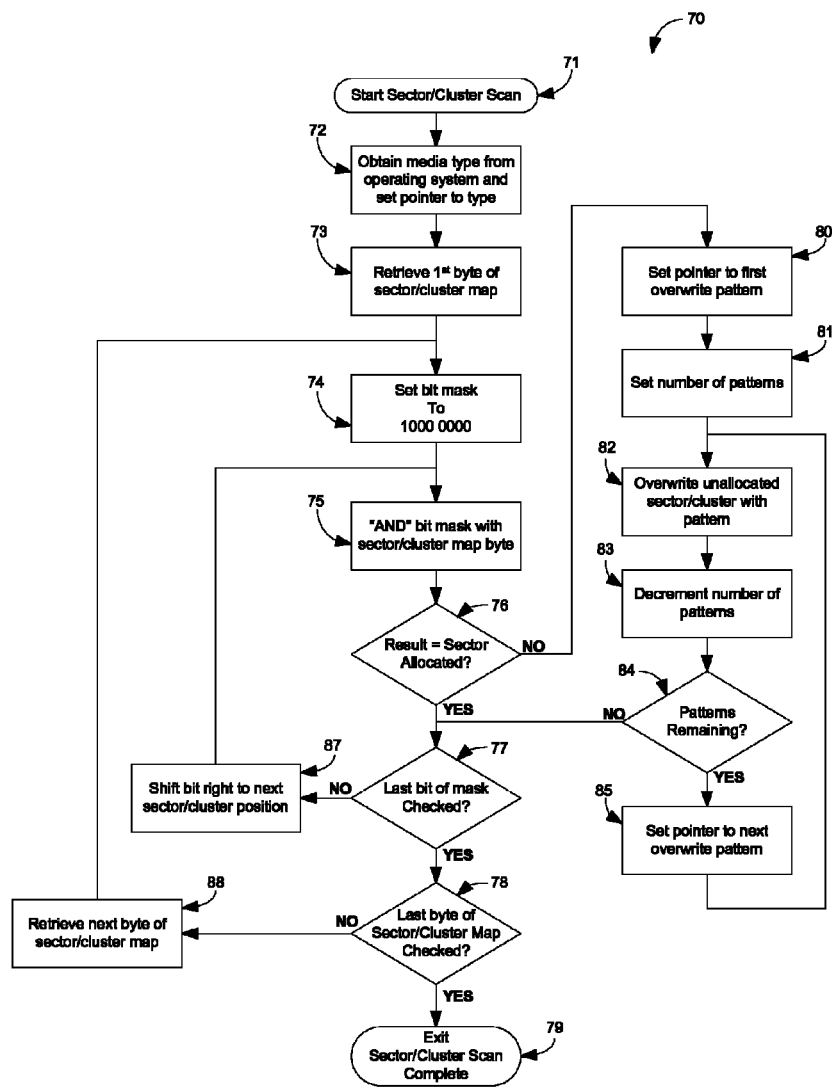
FIG. 5 depicts the logic flow chart for a software program that is launched by the operating system on a cyclic basis such that the program can scan the allocation table or map of the storage device and perform a security erase of any unallocated sector or cluster that had not been security erased.

FIG. 5 shows the logic flow 70 of the sector/cluster scan overwrite software program of the embodiments. In this flowchart 70, the operating system of the computer system the will call or cause software program 50 to be executed on some cyclic basis. When software program 70 is started, start sector/cluster scan 71 is the entry point to the software program. Processing block 72 interrogates the operating system for the physical media type of the physical storage device that is to be scanned. Note that software program 70 can be run by the operating system against internal storage devices and externally attached storage devices.

Processing block 72 obtains the physical media type from the operating system and accesses database 40 and sets a pointer to the correct entry 42, 43, or 44. For this example entry 44 media type 45 matches the physical media type obtained from the operating system. Processing block 73 then retrieves the first byte of sector/cluster map for the physical storage device.

From this point on there are three logical processing loops in software program 70. There is a outer loop ranging from processing block 74 to decision block 78, an inner loop ranging from processing block 75 to decision block 77, and one side processing loop ranging from processing block 82 to processing block 85.

The outer loop begins with processing block 74 which loads a byte size (8 bits) bit mask with a binary pattern of "1000 0000". Processing block 75 performs a logical AND of the bit mask with the current contents obtained from sector/cluster map 12 for the physical storage device. If the matching bits of sector/cluster map 12 for the physical storage device and the bit mask are both a binary "1", the resulting value will be a logical TRUE Boolean value. Decision block 78 examines the resulting Boolean value. If it is true, this indicates that the sector/cluster is currently allocated. If the Boolean value is FALSE, this indicates that the sector/cluster is not allocated and control will be pasted to processing block 80. Assuming that the resulting value of the AND function was TRUE, control will be passed to decision block 77.

Decision block 77 tests to see if the current bit in the bit mask is the last bit to be tested for this cycle. For this example the last bit position in the mask has the binary value of "0000 0001". If this is not the case, then control is passed to processing block 87. Processing block 87 shifts the pattern in the bit mask one position to the right. If the pattern in the bit mask prior to processing block 87 was "0100 0000" it will be shifted one position to the right resulting in the pattern being changed to "0010 0000". After the bit mask has been shifted one position to the right, control is passed to processing block 75 which is the beginning of the inner loop.

If decision block 77 determines that the pattern in the bit mask is "0000 0001", then it decides that this was the last bit in the mask to be tested and processing falls through to decision block 78. Decision block 78 determines if the current byte of sector/cluster map 12 being tested is the last byte of the sector/cluster map 12 control will be passed to exit point 79. If decision block 78 determines that the current byte of sector/cluster map 12 is not the last byte in sector/cluster map 12 control will be passed to processing block 88. Processing block 88 retrieves the next byte of the sector/cluster map and passes control to processing block 74 which is the start of the outer processing loop.

If decision block 76 determines that the result of the AND function which tests to see if the current sector/cluster being tested with the bit mask is not allocated, control will be passed to processing block 80. Processing block 80 accesses database 40 and sets a pointer to pattern 1 47 which is the fist overwrite pattern for media type 45. Processing block 81 then retrieves the number of patterns 46 and places the number into a counter.

Processing block 82 is the first block of the side processing loop. Processing block 82 overwrites the current pattern pointed to by the pointer initially set by processing block 80 on the sector or cluster identified by the current byte of sector/bluster map 12. After the sector or cluster identified by the current byte of sector/bluster map has been overwritten, control is passed to processing block 83. Processing block 83 decrements the number of patterns counter set by processing block 81.

Decision block 84 then determines is the number of patterns remaining to be written is greater than zero.

If the number of patterns counter is greater than zero, control is passed to processing block 85 which sets the pattern pointer initially set by processing block 80 to the next pattern.

Decision block 84 checks to see if the pattern counter is equal to 0. If the pattern counter is equal to 0 then control is passed to decision block 77. If the pattern counter is not equal to 0, processing block 85 will move the pattern pointer set by processing block 80 to the next pattern in the sequence of patterns then passes control to processing block 82 which starts the next overwrite pattern write.

Figure 6:
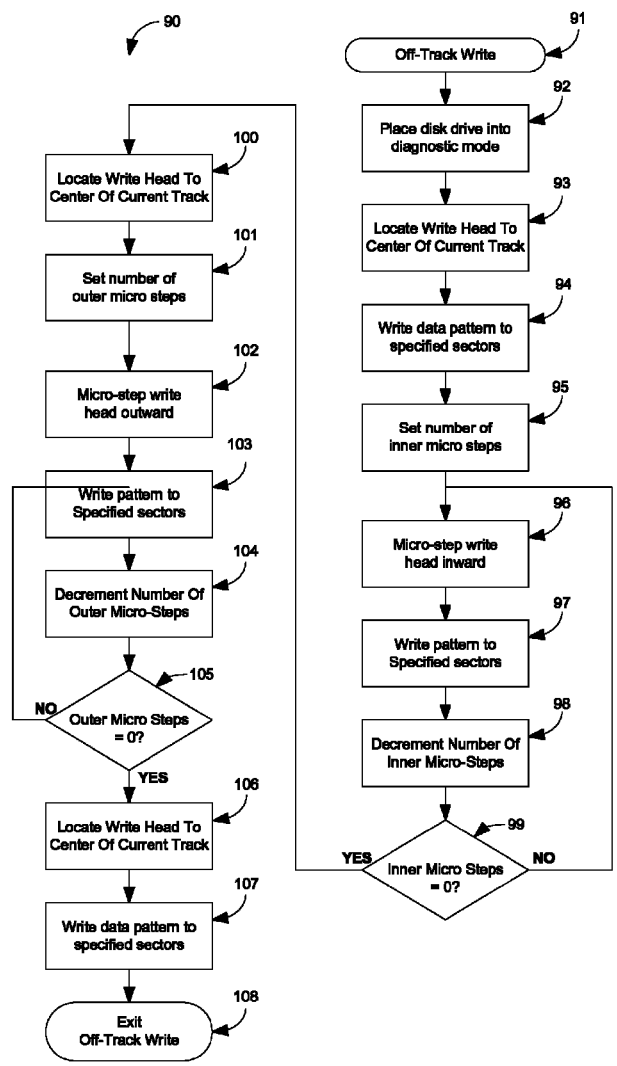
FIG. 6 depicts the logic flow chart for a software program that ensures that hard disk drives do not contain previously written data on the inner track areas of the disks.

Another method of recovering erased or reformatted data from hard disk drives is through the use forensic tools that can micro-step the write/read heads off of the center of the track to an area that is reserved by the disk drive. This area exists between the tracks of hard disk drive to cover the case where the heads may wander off of the center line of a given track. The case also exists that is referred to as "track creep". Hard disk drives have a tendency to move the track outward or inward depending on the drive. This movement is caused by wear of the various mechanical parts and assemblies in a hard disk drive. Overwriting a given track will normally only overwrite the track on the center of the track. If track creep has developed in the drive, then there exists the possibility of data remaining on the area between the tracks. FIG. 6 shows a flow diagram 90 is intended to cover the possibility of data being present in the areas between tracks.

Software program off-track write 91 is called by another application program such as those depicted in FIG. 4 and FIG. 5. When software program off-track write is called, the calling program will pass the pattern to be written, the first sector of the sequence to be written and the number of sectors to write.

Process block 92 commands the hard disk drive into a diagnostic mode where additional commands such as micro-step are available. Some hard disk drive may not need to be placed into a diagnostic mode in order for software program off-track write to access the hard disk's ability to be commanded to micro-step.

Processing block 93 will command the write head of the hard disk drive to the center of the current track containing the sectors to be written. Process block 94 then writes the data pattern received from the calling software program to the specified sectors.

Software program off-track write has two basic micro-step loops. The first loop ranges from processing block 96 to decision block 99. This loop micro-steps the write head inward toward the hub of the hard disk drive. The second loop ranges from processing block 102 to decision block 105. This loop micro-steps the write head outward from the center of the track toward the outer diameter of the hard disk drive.

The first loop receives control from processing block 95 which sets the number of micro-steps of the write head. Processing block 96 commands the write head inward for a specified distance or number of steps depending on the particular hard disk drive. Processing block 97 then writes the same pattern that had been written on the same sectors on the center of the track.

Processing block 98 then decrements the number of inner micro-steps and passes control to decision block 99. Decision block 99 checks to see if the number of remaining micro-steps is zero. If the number of remaining micro-steps is greater than zero, it passes control to the beginning of the fist loop at processing block 96. If the number of remaining micro-steps is zero decision block 99 passes control to processing block 100.

Processing block 100 will command the write head of the hard disk drive to the center of the current track containing the sectors to be written.

The second loop receives control from processing block 101 which sets the number of micro-steps of the write head. Processing block 102 commands the write head outward for a specified distance or number of steps depending on the particular hard disk drive. Processing block 103 then writes the same pattern that had been written on the same sectors on the center of the track.

Processing block 104 then decrements the number of outer micro-steps and passes control to decision block 105. Decision block 105 checks to see if the number of remaining micro-steps is zero. If the number of remaining micro-steps is greater than zero it passes control to the beginning of the second loop at processing block 102. If the number of remaining micro-steps is zero decision block 105 passes control to processing block 106.

Processing blocks 106 and 107 clean up the track that has just been processed, ensuring that the center of the track contains valid data in the form of the overwrite pattern. Processing block 106 will command the write head of the hard disk drive to the center of the current track containing the sectors to be written. Process block 107 then writes the data pattern received from the calling software program to the specified sectors. Control is then passed to exit off-track write 108.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. The present application describes use of a hard drive in a computer system, operating to execute programs. Other drives and other techniques can be supported in analogous ways.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the embodiments. Various modifications to these exemplary embodiments will be readily apparent to those skilled in the art, and the generic principles defined herein may be applied to other embodiments without departing from the spirit or scope of the embodiments. Thus, the embodiments is not intended to be limited to the embodiments shown herein but is to be accorded the widest scope consistent with the principles and novel features disclosed herein.

What is claimed is:

1. A computer system with secure erase capabilities, comprising:
a processor, analyzing a file system on a physical memory media to determine data of the file system that represent file portions on the memory media which are intended to be deleted, to determine information about said physical memory media and to determine at least one but less than all of multiple different overwrite patterns will best overwrite said memory media based on said information, as at least one selected overwrite pattern, and outputting signals for writing said at least one selected overwrite pattern over said data.

2. The computer system as in claim 1, wherein said processor writes multiple patterns as said at least one selected pattern by first writing a first pattern of said multiple patterns over said portions, and second writing other patterns of said multiple patterns over said portions.

3. The computer system as in claim 2, wherein said processor includes a pattern counter, storing a value that includes a number representing a number of patterns to be written, and operates to decrement a value in said pattern counter each time one of said patterns is written.

4. The computer system as in claim 1, wherein said request is for at least one file that have been indicated by a user as being deleted.

5. The computer system as in claim 1, wherein said request is made by the computer system.

6. The computer system as in claim 5, wherein said request made by the computer system is to delete areas of a file which remain when a new file is shorter than a version of the file that is older than the new file.

7. The computer system as in claim 1, wherein said request is for outputting signals that command a writing head within the physical media to write said overwrite patterns at different radial locations corresponding to different offsets along a track.

8. A computer system, comprising:
a processor, said processor operating according to a program for analyzing a file system on a physical memory media to determine portions of the file system that represent file portions on the memory media which are intended to be deleted;
said processor writing at least one pattern over said data to overwrite said file portions, by outputting signals that command a writing head within the physical media to write said at least one pattern at multiple different radial locations corresponding to different offsets along a track of said memory media.

9. The system as in claim 8, wherein said processor operates to first determine, using said computer system, information about said physical media and second determining which at least one but less than all of multiple different overwrite patterns will best overwrite said memory media as at least one selected overwrite pattern, and said processor writing said at least one selected overwrite pattern over said data at said multiple different radial offsets.

10. The system as in claim 8, wherein said at least one optimal overwrite pattern comprises multiple patterns to be written, and said processor operates to first write a first pattern of said multiple patterns over said portions, and second write other patterns of said multiple patterns over said portions.

11. The system as in claim 9, further comprising a pattern counter, storing a value that includes a number representing a number of patterns to be written, and said processor operating for decrementing said value in said pattern counter each time one of said patterns is written on said portions.

12. A computer system, comprising:
a processor, analyzing a file system on a physical memory media to determine at a first time, first areas on the physical memory representing deleted files, and to determine at a second time, second areas on the physical memory representing areas remaining when a smaller file has been saved in place of a larger file and outputting signals operating to write overwrite patterns over both of said first areas and said second areas.

13. The system as in claim 12, wherein said processor operates to first determine information about said physical media and to second determine which at least one but less than all of multiple different overwrite patterns will best overwrite said memory media as at least one selected overwrite pattern, and said processor writing said at least one selected overwrite pattern over said data.

14. The system as in claim 12, wherein said processor further outputting signals that command a writing head within the physical memory media to write said overwrite patterns at different radial locations corresponding to different offsets along a track.

15. The system as in claim 14, wherein said processor operates to first determine information about said physical media and to second determine which at least one but less than all of multiple different overwrite patterns will best overwrite said memory media as at least one selected overwrite pattern, and said processor writing said at least one selected overwrite pattern over said data.

16. A computer product comprising a processor and memory storing executable instructions, that when executed, implement a secure erase program, said executable instructions comprising:
analyzing a file system on a physical memory media to determine data of the file system that represent file portions on the memory media which are intended to be deleted, to determine information about said physical memory media;
based on said information, to determine at least one but less than all of multiple different overwrite patterns will best overwrite said memory media as at least one selected overwrite pattern; and
output signals for writing said at least one selected overwrite pattern over said data.

17. The product as in claim 16, wherein said output signals comprises writing multiple patterns as said at least one selected pattern by first writing a first pattern of said multiple patterns over said portions, and second writing other patterns of said multiple patterns over said portions.

18. The product as in claim 16, further comprising instructions for implementing a pattern counter, storing a value that includes a number representing a number of patterns to be written, and operating to decrement a value in said pattern counter each time one of said patterns is written.

19. The product as in claim 16, wherein said request is for at least one file that have been indicated by a user as being deleted.

20. The product as in claim 16, wherein said request is made by a computer system.

21. The product as in claim 20, wherein said request made by the computer system is to delete areas of a file which remain when a new file is shorter than a version of the file that is older than the new file.

22. The product as in claim 16, wherein said request is for outputting signals that command a writing head within the physical media to write said overwrite patterns at different radial locations corresponding to different offsets along a track.

\* \* \* \* \*